United States Patent [19]

Chapman et al.

[11] 4,386,801
[45] Jun. 7, 1983

[54] GROUND EFFECT VEHICLE

[75] Inventors: Anthony C. B. Chapman; Peter G. Wright, both of Norwich, England

[73] Assignee: Team Lotus International Limited, Norfolk, England

[21] Appl. No.: 211,038

[22] Filed: Nov. 28, 1980

[30] Foreign Application Priority Data

Nov. 28, 1979 [GB] United Kingdom ............... 7941128

[51] Int. Cl.³ .............................................. B62D 35/02
[52] U.S. Cl. ................................................. 296/1 S
[58] Field of Search ........................................ 296/1 S

[56] References Cited

U.S. PATENT DOCUMENTS

| 2,955,869 | 10/1960 | Blaser | 296/1 S |
| 4,049,309 | 9/1977 | Seal | 296/1 S |
| 4,072,336 | 2/1978 | Ruzicka | 296/1 S |

FOREIGN PATENT DOCUMENTS

| 710241 | 7/1941 | Fed. Rep. of Germany | 296/1 S |
| 1063557 | 5/1954 | France . | |
| 2062016 | 6/1971 | France . | |
| 2363472 | 3/1978 | France . | |
| 1419497 | 12/1975 | United Kingdom . | |

*Primary Examiner*—Robert R. Song
*Attorney, Agent, or Firm*—Young & Thompson

[57] ABSTRACT

A wheeled vehicle has an undertray shaped to form a venturi duct with a road or like surface over which the vehicle moves, the undertray being carried in substantially fixed relationship with the wheels, so that the vehicle chassis or body can move relative to the wheels without substantial alteration of the shape of the venturi duct. The undertray can comprise the lower wall of a shell enclosing the vehicle body or chassis.

9 Claims, 3 Drawing Figures

GROUND EFFECT VEHICLE

BACKGROUND OF THE INVENTION

The invention relates to a ground effect vehicle, that is, a vehicle having means for inducing negative lift.

It is known to shape the undersurface of the body of a racing car and to provide the car with longitudinally extending skirts at its sides, in such a manner as to define a venturi duct between the body and a road surface over which it moves, so that the flow of air between the car body and the road surface tends to increase the contact loading of the car to the surface. This so-called "ground effect" depends on the shaping of the undersurface and the skirts so that the air flow in the venturi duct has a velocity everywhere greater than at the airflow exit at the rear of the car. The air consequently has a lower pressure everywhere in the duct than at the exit. This low pressure acts on the undersurface of the car body to generate negative lift. The downward or negative lift component of force acting on the car body is transmitted through the suspension and the springs so as to increase the grip of the tires on the road. The effect is also to reduce the induced drag of the car, with a consequent reduction in the energy employed in moving it.

It is a disadvantage of such an arrangement that the aero-dynamic characteristics dictated by the undersurface shape are affected by its relationship to the road surface, which continuously changes during cornering, acceleration and braking loads. Moreover, the suspension characteristics of the car are changed because they must absorb and transmit the aero-dynamic loads. The design of the skirts provided at the sides of the car to help define the venturi duct is complicated by the need to accommodate considerable movements between the vehicle body and the road surface.

SUMMARY OF THE INVENTION

It is accordingly an object of the present invention to provide a ground effect vehicle in which these disadvantages are minimised or overcome.

It is also an object of the invention to provide means whereby a conventional vehicle can readily be converted to a ground effect vehicle.

It is a further object of the invention to provide a vehicle which experiences a predetermined negative lift substantially independent of the vehicle attitude of the vehicle to a surface on which it is supported.

The invention accordingly provides a vehicle having a body with suspension means by which supporting wheels are mounted thereon, and means arranged to form a venturi duct with a surface on which the vehicle is supported, to thereby provide the vehicle with negative lift, the duct-forming means being mounted for movement with the wheels relative to the vehicle body.

In accordance with the invention therefore, the spacing of the duct forming means relative to the road or support surface is dependent on the relationship of the wheels to the surface, which is normally substantially constant, instead of on the relationship of the vehicle body to the surface.

The duct forming means can comprise a plate-like member or undertray, fitted along its sides with sideplates or side plate portions just clear of the ground, or with ground-engaging skirts, and connected directly to the wheel uprights or axles. Any necessary compliance between the undertray and the wheels can be provided by the flexibility of the undertray itself or by compliance in the required directions provided by the means by which the undertray is secured in place. Clearance between the undertray and the chassis or vehicle body is provided and the duct-forming means can be part of a structure extending upwardly from the actual duct-forming undersurface to make a flexible seal with the vehicle body. Such a structure can be provided with mounting means for securement to an existing conventional vehicle to convert this to a ground effect vehicle. The duct forming means can be extended upwardly to provide an outer shell for the vehicle, the source of motive power and accommodation for driver and any passengers being then provided in the vehicle body enclosed by the shell and on which the wheels are mounted.

The present invention can be usefully embodied in racing cars but is applicable also to other road vehicles for example private cars, commercial vehicles and buses. The invention can be embodied in rail vehicles also where negative lift is desired.

BRIEF DESCRIPTION OF THE DRAWINGS

The invention is further described below by way of example only and without limitation of the scope thereof with reference to the accompanying drawings, in which.

Figure 1:
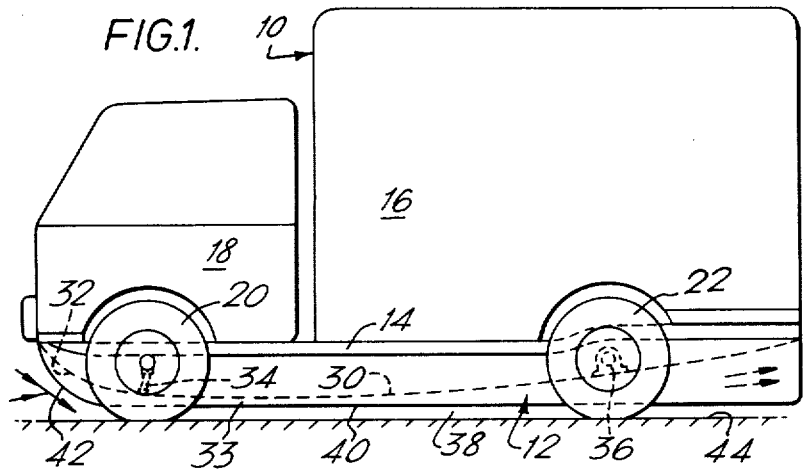
FIG. 1 is a schematic side view of a commercial goods vehicle embodying the invention.
Figure 2:
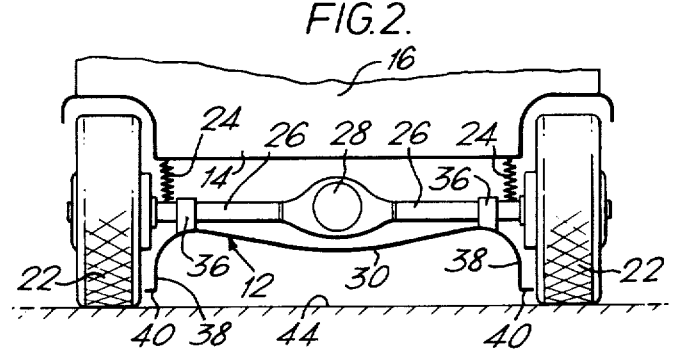
FIG. 2 is a partial schematic sectional end view of the vehicle of FIG. 1 taken rearward of the rear axle thereof.

The commercial goods vehicle 10 illustrated in FIGS. 1 and 2 is of conventional structure except for the addition thereof of a ground effect undertray 12 in accordance with the invention. The vehicle 10 has a chassis 14 mounting a compartment 16 for carriage of goods and a cabin 18 which accommodates the driver and contains the vehicle engine. Front and rear wheels 20,22 are carried by the chassis 14 by suspensions of which springs 24 of the rear axle suspension are shown in FIG. 2 extending between the chassis 14 and halfshaft casings 26 extending from a differential casing 28.

In accordance with the invention, the vehicle 10 is provided with an undersurface beneath the chassis 14 by the undertray 12. As appears from FIG. 1, the undertray 12 is of generally sheet-like construction, having a floor 30 which appears generally linear in transverse cross-section except where departures from linearity are appropriate to accommodate underlying portions of the vehicle for example the differential casing 28 as shown in FIG. 2. The floor 30 has a front portion 32, which forms a convex rearwardly curved downward extension of the front surface of the cabin 18, and which extends to a throat 33. From the throat 33, the floor 33 extends rearwardly, sweeping gradually upwardly to end at the lower rear edge of the chassis 14 or the compartment 16. The shape of the undersurface, if inverted, would correspond generally to the upper surface of an aerofoil. At its lateral edges, the floor 30 has downwardly extending skirt portions 38 which extend linearly in the front-to-rear direction of the vehicle adjacent to and on the inner side of the wheels. The lower marginal edges 40 of the skirt portions 38 are uniformly horizontal except for the front portions 42 which are convexly curved downwardly and rearwardly from the lower front edge of the cabin 18.

The undertray 12 is supported beneath the vehicle, not by attachment to the chassis 14 but by securement to the wheel axle structures. Thus the undertray 12 is connected to the front axles by fittings 34, and to the rear half shaft casings 26 by brackets 36 extending therearound. A certain relative movement between the front and rear axle structures of the vehicle is accommodated either by the inherent flexibility of the material of the undertray 12, or by an appropriate degree of compliance in desired directions provided in the fittings 34 or the brackets 36, or both.

The shape of the floor 30 rearwardly of the throat 33 is such that the undertray 12 forms a venturi duct with the road surface 44 over which the vehicle 10 travels. Air flowing into the duct experiences an increase in speed as it progresses along the duct to the throat 33 and it then diffuses smoothly back to the free-stream velocity at the trailing edge of undertray 12. Whereever the velocity is greater than the free-stream velocity, there is a reduction in pressure which reduces lift of the vehicle and aids ground engagement.

The negative lift produced by the venturi duct acts on the undertray 12, and is thus transferred directly to the road wheels 20,22 through the fittings 34 and brackets 36. Because the undertray 12 is carried by the wheel support structure of the vehicle, no allowance need be made for the movements permitted by the suspension means, of the chassis relative to the road surface 44. The marginal edges 40 of the skirt portions 38 consequently can be designed to be quite close to the ground surface 44.

Figure 3:
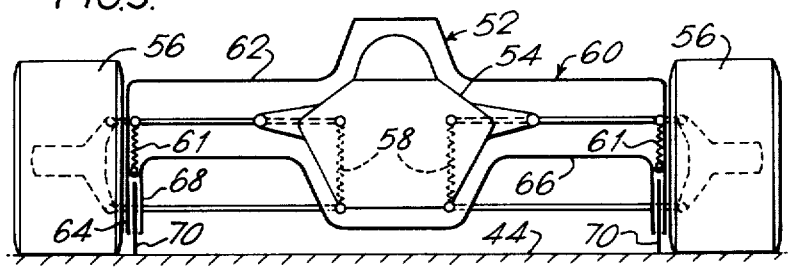
FIG. 3 is a schematic sectional front view of a racing car embodying the invention.

In the racing car 52 embodying the invention and shown in FIG. 3, substantially the entire vehicle outer surface, instead of the effective undersurface of the car only, is substantially fixed with relation to the road wheels.

The car 52 thus comprises a body or chassis 54 mounting the engine and the fuel tank, and accommodating the driver. The road wheels 56 are carried by the chassis by way of suspension means including springs 58. Instead of having an outer shell carried directly by the chassis 54, the car has an outer shell 60 which surrounds the chassis with clearance and is carried by the suspension means by way of springs 61 for movement substantially with the wheels 56 regardless of changes in the attitude of the chassis to the wheels accommodated by the suspension means.

The shell 60 provides an appropriate aerodynamically shaped outer surface for the vehicle, and has an upper wall 62, with downwardly extending side portions 64 inwardly of and adjacent the wheels 56, and a lower wall 66 which has a central longitudinal depression to accommodate the chassis 54. The lower wall 66 is shaped longitudinally to form a venturi duct with the road surface 44.

These downturned side portions 64, or downwardly extending side portions 68 of the lower wall 66, could constitute skirts at the sides of the venturi duct, but it is preferred that these portions 64, 68 be slightly spaced apart to slidingly receive between them separate skirts 70, the lower edges of which ride on the road surface 44. In this way, an excellent seal of the sides of the venturi duct of the road surface 44 is achieved.

It will be evident that the chassis 54 together with the suspension means and the wheels 56 constitute a complete vehicle, which however lacks an appropriate outer casing. This is supplied by the shell 60, which provides not only an aero-dynamically appropriate front, rear and upper surfaces, but also a lower surface providing the vehicle with negative lift, which is applied directly to the wheels 56.

The invention can of course be embodied in other ways, and to other kinds of vehicles than as specifically described.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. A vehicle comprising:
   body means,
   wheel means for supporting the vehicle on a support surface,
   suspension means connecting together said body means and said wheel means, said suspension means being adapted to permit relative movement between said wheel means and said body means,
   underbody means shaped to co-operate with said support surface to form therewith a venturi duct, and
   means mounting said underbody means for movement with said wheel means relative to said body means.

2. The vehicle of claim 1 having axles for said wheel means wherein said underbody means is suspended from said axles by said mounting means.

3. The vehicle of claim 2 wherein said suspension means is adapted to permit movement of at least one of said wheel means relative to the remaining of said wheel means, and said mounting means is adapted to accommodate said relative movement.

4. The vehicle of claim 2 wherein said suspension means is adapted to permit movement of at least one of said wheel means relative to the remaining of said wheel means, and said underbody means is flexible to accommodate said relative movement.

5. The vehicle of claim 1 wherein said underbody means has a front portion thereof forming a convex rearwardly curved downward extension of the front surface of said body means.

6. The vehicle of claim 1 wherein said underbody means is a part of a shell substantially enclosing said body means.

7. The vehicle of claim 1 wherein said underbody means has along each side thereof a downwardly extending side portion having a lower edge spaced from said support surface.

8. The vehicle of claim 1 wherein said underbody means has along each side thereof a downwardly extending skirt portion having a lower edge, said skirt portions being adapted to engage said support surface.

9. The vehicle of claim 8 wherein said underbody means has a downwardly open longitudinal slot extending along each side thereof, and said skirt portions are slidable up and down within said slots.

* * * * *